June 24, 1958 M. C. BRANCH 2,840,702

VARIABLE IMPEDANCE CIRCUIT

Filed Dec. 11, 1952 2 Sheets-Sheet 1

Inventor
M. C. BRANCH

By Robert Harding Jr.
Attorney

VARIABLE IMPEDANCE CIRCUIT

Inventor
M. C. BRANCH
By Robert Harding Jr.
Attorney

United States Patent Office 2,840,702

Patented June 24, 1958

2,840,702

VARIABLE IMPEDANCE CIRCUIT

Maurice Charles Branch, London, England, assignor to International Standard Electric Corporation, New York, N. Y., a corporation of Delaware Application December 11, 1952, Serial No. 325,485

Claims priority, application Great Britain December 20, 1951

1 Claim. (Cl. 250—27)

The present invention relates to electrical circuits.

The main feature of the present invention comprises a variable impedance cathode circuit for a gas or vacuum tube comprising two branches from said tube cathode, the first of said branches including a resistance connected to a first potential, and the second of said branches including a rectifier connected to a second potential in which said first potential is negative with respect to said second potential, and in which the rectifier is so poled that it prevents the cathode from going negative with respect to said second potential, whereby when the tube is quiescent its cathode circuit impedance equals the forward resistance of the rectifier, and when the tube is passing current its cathode circuit impedance equals that of said resistance.

The invention will now be described with reference to the accompanying drawings, in which, Fig. 1 is a known circuit.

Figure 1:
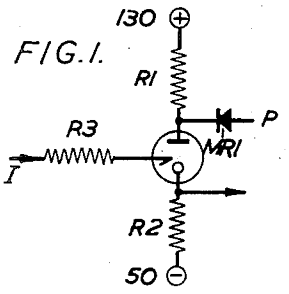

The known circuit of Fig. 1 shows the application of a single cold-cathode gaseous discharge tube as a storage element. The tube anode is connected to +130 volts via resistance R1, its cathode is connected to —50 volts via resistance R2, and its trigger electrode is fed from an input connection via R3.

The input connection normally goes to a potential such as earth, so chosen that the normal trigger-cathode potential is insufficient to fire the tube. The condition to be stored is represented by a positive potential applied to the input I and therefrom to the trigger via R3. This potential is sufficient to fire the tube at the trigger to cathode gap only. When a pulse is stored on the tube by being applied to I, the steady-state voltage after the pulse ends is chosen so as to maintain the trigger-cathode gap only. The current flow in the cathode circuit due to the discharge in the trigger-cathode gap is of the order of micro-amperes, so that the effect thereof on the cathode voltage is negligible.

With such a storage circuit it is desirable to be able to check the arrangement to see if the tube is discharging at its trigger-cathode gap, i. e. to see if the condition is stored on the tube. For this purpose a positive pulse P is applied to the anode via a rectifier MR1. This pulse and the normal anode voltage cannot fire the tube unless the trigger-cathode gap is already fired. Therefore the pulse can only fire the tube if the condition is stored therein. When the main anode-cathode gap is discharging, the increased current flows through R1 and R2 and the gap increases the voltage at the top end of R2, so that a positive-going impulse is produced at the cathode. No such impulse is produced at the cathode if the trigger-cathode gap was quiescent when the pulse was applied. The anode-cathode voltage is below the main gap maintaining voltage, so the main gap is extinguished, when the pulse ends. The fact that the pulse P is "gated" through the tube indicates that the condition was stored thereon.

To get a good sized output pulse when the P pulse is applied to a primed tube, R2 should be larger than the forward resistance of MR1. In practice it is difficult to produce the correct relation between the values of the resistances in Fig. 1, and at the same time keep within the minimum maintain voltage condition and maximum pulse current ratings of V1.

Figure 2:
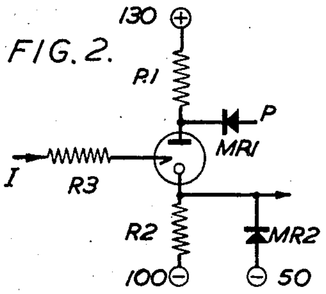
Fig. 2 is a circuit according to the present invention.

The arrangement of Fig. 2 overcomes these disadvantages. In the arrangement, the cathode resistance R2 is connected to a more negative potential than that of Fig. 1, to —100 volts in the present case. The cathode is also connected to a metal rectifier MR2, poled, as shown, and connected to a less negative potential than is R2, in the present case to —50 volts. This rectifier serves to "catch" the cathode at —50 volts, so that the cathode voltage cannot fall below —50 volts. This means that until the cathode voltage is caused to rise above, i. e. to become less negative than, —50 volts, the impedance of the cathode load is equal to the forward resistance of MR2. When the cathode voltage rises above —50 volts, MR2 is blocked, and thus its effective resistance becomes its back resistance. The effective cathode load is therefore now R2.

As before, the conditions to be stored fires the trigger-to-cathode gap of the tube, and as the current flow in the cathode circuit, due to this discharge, is of the order of microamperes, the potential at the cathode of the tube is substantially unaltered. Also as before, a pulse applied at P has no effect on an unprimed tube. When the pulse is applied at P to a tube whose trigger-cathode gap is discharging, the tube fires. Current therefore flows through R1, the main gap and R2 in series. This current flow causes the voltage on the cathode of the tube to rise above —50 volts, thus blocking the rectifier MR2. Actually, of course, with a dry-plate rectifier, the term "blocking" means causing the rectifier to assume its high resistance condition. Hence the effective resistance of the cathode circuit is substantially equal to the value of R2.

The output pulse is developed, as before, across R2, but with the Fig. 2 arrangement, it is possible to make R2 considerably larger than was possible in the case of Fig. 1. This is because the "catching" rectifier MR2 provides what is, in effect, a variable cathode load for the tube. Thus it is possible to obtain a large voltage output pulse while still keeping within the operating limits of the tube.

Figure 3:
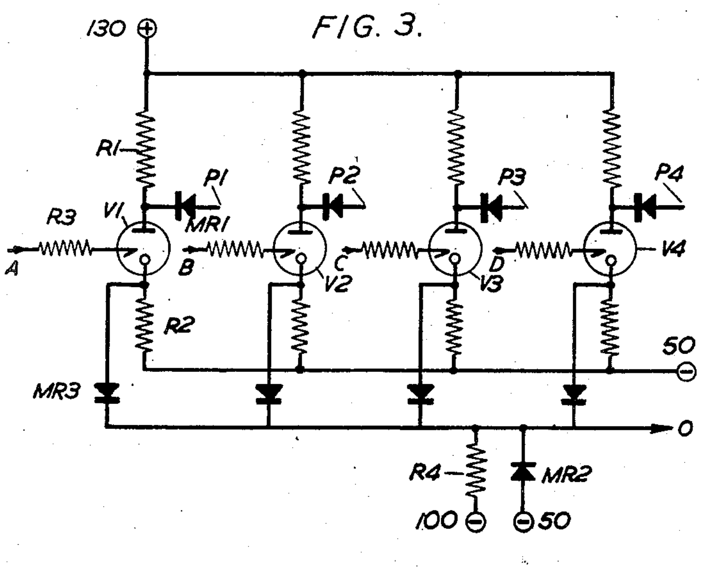
Fig. 3 is an application of the invention to an assembly of four storage devices of the Fig. 1 type.

In the circuit of Fig. 3, four storage tubes V1 to V4 are shown, each being of the Fig. 1 type. Each tube has its cathode connected via a rectifier such as MR3 to a common cathode load circuit formed by MR2 and R4. The common cathode load circuit is arranged in the same manner as the cathode circuit of the tube of Fig. 2. As before, MR2 acts as a "catching" rectifier for whichever tube of V1 to V4 is being tested.

Each tube of V1 to V4 has a different input, A to D respectively, and the tubes are examined to see whether their priming gaps are discharging at different time positions P1 to P4. Whichever tube is being examined, that tube's cathode circuit is effectively the R4—MR2 circuit if the tube conducts.

A typical application of such a circuit is the storage in binary code of a single decimal digit. In this case a tube whose priming gap (i. e. the trigger-cathode gap) is discharging represents the binary digit 1, and a tube whose primary gap is not discharging represents the binary digit 0. When the circuit is tested, assuming that it has been set, the tubes are examined in turn, and a pulse train is developed at the output point O which represents the binary coded value of the digit. The order of testing can be altered so that this pulse train can have the digits of greatest or least significance first.

Figure 4:
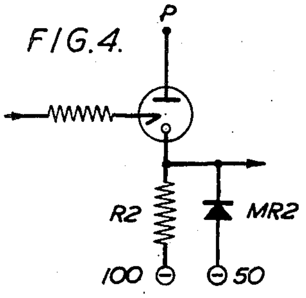
Fig. 4 is a pulse gate circuit employing the present invention.

Fig. 4 is a simple pulse gate in which the sole anode supply for the tube is the pulse which is gated therethrough. Unless the priming gap is discharging, the pulse is not gated.

Figure 5:
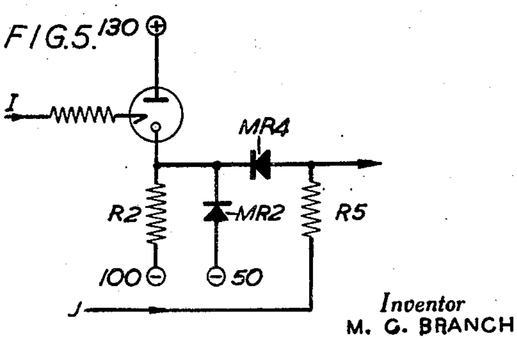
Fig. 5 is a pulse gate controlled by a tube whose circuit employs the present invention.

Fig. 5 shows a shunt rectifier gate using a resistance R5 in series with the circuit and a rectifier MR4 in shunt therewith. While the left-hand end of MR4 is connected to a relatively negative potential, in this case −50 volts when the tube is quiescent, a train of positive pulses applied to J is shunted via MR4 and there is no effective output. However, when the tube is fired, and in this arrangement it remains fired when the firing pulse applied at I ends, the rectifier MR4 is biassed by the cathode circuit to its high resistance condition, i. e. it is blocked, and the pulse train at J is passed via R5 to the output. R5 has a value between the back and front resistance values of MR4. The cathode circuit R2—MR2 functions in the same manner as does the corresponding circuit of Fig. 2.

Figure 6:
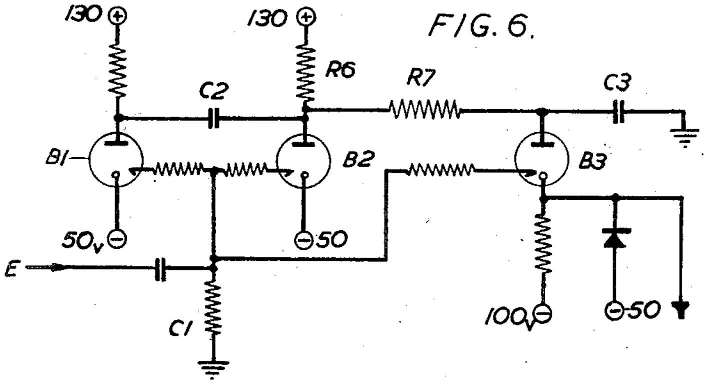
Fig. 6 is a single stage of a binary counter having a gas tube for interconnection between stages, which gas tube's circuit embodies the present invention.

The circuit at Fig. 6 shows a single stage of a binary counter of the type having a gas tube B3 as an inter-stage coupling circuit. In this circuit, the driving pulses are applied at E via a condenser C1 to the trigger electrodes of both tubes. Each impulse applied at E reverses the discharging condition of the tubes. Tube B2 is initially discharging, this being effected by means not shown.

An applied impulse causes the unfired tube to be fired, and the reduction in its anode voltage causes a negative pulse to be applied to the anode of the other tube via C2. This negative pulse extinguishes the previously-firing tube.

The first applied pulse fires B1, which extinguishes B2. This has no effect on the coupling tube B3 since the anode of this is connected to the anode of B2. With B2 firing, the anode potential of B3 is held below the firing voltage, so that even when the driving pulse matures, B3 cannot fire. Even during the pulse B3 cannot fire, since the time constant of C3 and R6—R7 is such that C3 does not change sufficiently for B3 to fire until after the pulse ends.

The second applied pulse fires B2 and extinguishes B1. Thus two pulses have arrived, the binary stage has returned to zero, and a "carry" pulse is required. By now C3 will have fully charged, so that the pulse, in addition to firing B2, fires B3. The driving pulse for the next stage is taken from the cathode of B3.

The circuit of the tube B3 is similar to that of the tube of Fig. 2. In this a pulse is gated through when the circuit reutrns to zero, i. e. when the anode of B2 is positive, and has been for long enough to charge C3, and when a pulse is applied to the trigger of B3. On odd numbered pulses, the priming gap of B3 fires, but this has no effect on the output. On even-numbered pulses, the main gap is fired. Thus B3 operates in the same manner as does the tube in Fig. 2.

Figures 7, 9:
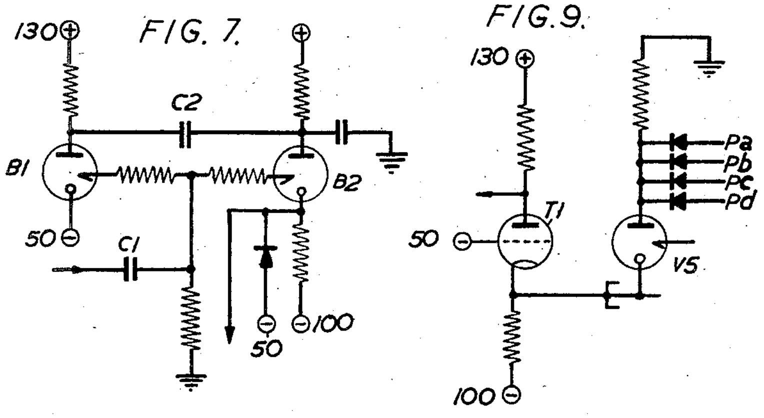
Fig. 7 is a single stage of a binary counter embodying the invention.
Fig. 9 is an alternative form of the invention.

Fig. 7 is a binary counter in which the "pass-on" pulse or carry pulse is taken from the cathode of B2, which is initially discharging. As before, the first pulse fires B1, extinguishing B2, and the second pulse fires B2, extinguishing B1. The sudden rise in cathode voltage provide sthe "carry" pulse. The tube B2 therefore operates in the same manner as does the tube of Fig. 1.

In both the Fig. 6 and Fig. 7 circuits, the cathode voltages of the tubes supplying the carry voltage are stabilised and the output waveforms improved.

Figure 8:
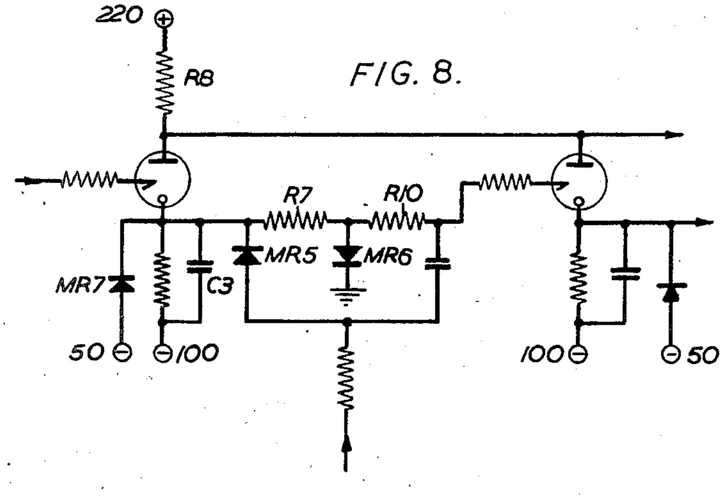
Fig. 8 is a "pulse plus bias" counting train embodying the invention.

Fig. 8 is a counting train of the "pulse plus bias" type having a common anode resistance R8. One tube is initially fired, and each time a pulse is applied to the trigger circuits of all tubes, the tube immediately succeeding the discharging tube is fired. The previously firing tube is then extinguished because of the increased voltage drop across R8. In this circuit, the driving pulse is gated to the previous tube's cathode via MR5 and to the next tube's trigger electrode, whereby a higher value of trigger voltage is obtained. The connection of the centre point between resistances R7 and R10 to earth via MR6 provides the bias for the trigger of the tube.

In the absence of MR7, and with the cathode circuit returned to a lower voltage, the suppression of the pulse produced when the priming gap only fires is solely dependent on C3. However by adopting the arrangement of Fig. 8, MR7 suppresses effectively such unwanted pulses. Hence the cathode circuit operation of Fig. 8 is identical to that of Fig. 2.

Although the arrangements of Figs. 2 to 8 have used dry-plate rectifiers for the "catching" rectifier, it would be possible to use thermionic diodes, or to use any other form of unidirectional current carrying devices. Such devices are referred to in the claim as rectifiers. In fact in one form of the invention shown in Fig. 9, a thermionic triode T1 is used as the "catching" element. The grid-cathode circuit is used as a diode, the grid being connected to −50 volts, and the output is taken from the anode circuit.

The gas tube V5 is arranged when its priming gap is discharging to gate through a train of pulses selected from P*a* to P*d*. Each of these pulses when gated through causes the cathode potential of T1 to rise. With the potentials indicated, T1 is normally conducting with its cathode at or near to −50 volts. When a positive pulse appears at its cathode, the valve is cut off (or the current flow reduced) to give a positive going output pulse. In this circuit the triode T1 is also used as a pulse amplifier.

This circuit can also be used as a simple pulse amplifier.

Although the variable impedance cathode circuit has been described only in its applications to cold cathode gaseous discharge tubes, it is also applicable to other forms of tubes such as thermionic vacuum tubes.

While the principles of the invention have been described above in connection with specific embodiments and particular modifications thereof, it is to be clearly understood that this description is made only by way of example and not as a limitation on the scope of the invention.

What I claim is:

In a circuit for a discharge tube having electrodes including a cathode, a trigger, and an anode, a source of positive potential connected to said anode, and first and second sources of negative electrical potentials, the combination of a rectifier connected between said first negative potential source and the cathode, a resistance connected between the cathode and said second negative potential source, the potential of said second potential source being negative with respect to the first negative potential source, said rectifier being so poled that it prevents said cathode from going negative with respect to said first negative potential source, whereby when said tube is quiescent its cathode circuit impedance equals the forward resistance of said rectifier, a circuit for applying positive potential to the trigger without producing appreciable voltage change in the cathode, and a circuit for applying additional positive potential to the anode to cause the tube to pass current without increasing the cathode circuit impedance above that of said resistance.

(References on following page)

References Cited in the file of this patent

UNITED STATES PATENTS

| | | |
|---|---|---|
| 2,115,352 | Thompson | Apr. 26, 1938 |
| 2,310,112 | Palmer | Feb. 2, 1943 |
| 2,394,891 | Bowie | Feb. 12, 1946 |
| 2,407,458 | Spielman | Sept. 10, 1946 |
| 2,553,366 | Fry | May 15, 1951 |
| 2,583,345 | Schade | Jan. 22, 1952 |
| 2,603,765 | Reeves | July 15, 1952 |
| 2,648,725 | Wright et al. | Aug. 11, 1953 |
| 2,734,684 | Ross et al. | Feb. 14, 1956 |
| 2,758,250 | Ridler et al. | Aug. 7, 1956 |